(12) United States Patent
Iwai et al.

(10) Patent No.: US 11,496,347 B2
(45) Date of Patent: *Nov. 8, 2022

(54) TERMINAL, BASE STATION, AND COMMUNICATION METHOD FOR REFERENCE SIGNALS WITH PHASE SHIFT INDEXES

(71) Applicant: Panasonic Intellectual Property Corporation of America, Torrance, CA (US)

(72) Inventors: Takashi Iwai, Ishikawa (JP); Tomohumi Takata, Ishikawa (JP); Hidetoshi Suzuki, Kanagawa (JP); Ayako Horiuchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/147,158

(22) Filed: Jan. 12, 2021

(65) Prior Publication Data

US 2021/0135819 A1 May 6, 2021

Related U.S. Application Data

(63) Continuation of application No. 16/462,934, filed as application No. PCT/JP2017/036299 on Oct. 5, 2017, now Pat. No. 10,924,239.

(30) Foreign Application Priority Data

Jan. 6, 2017 (JP) .................................. 2017-001229

(51) Int. Cl.
*H04L 27/26* (2006.01)
*H04L 5/00* (2006.01)

(52) U.S. Cl.
CPC ........ *H04L 27/2613* (2013.01); *H04L 5/0007* (2013.01); *H04L 5/0048* (2013.01); *H04L 5/0053* (2013.01)

(58) Field of Classification Search
CPC ... H04L 5/0048; H04L 5/0007; H04L 5/0053; H04L 27/2613; H04L 27/26;
(Continued)

(56) References Cited

U.S. PATENT DOCUMENTS

2007/0253465 A1  11/2007  Muharemovic et al.
2008/0212555 A1   9/2008  Kim et al.
(Continued)

FOREIGN PATENT DOCUMENTS

CN   101009527 A   8/2007
CN   102769592 B   3/2015
(Continued)

OTHER PUBLICATIONS

3GPP TSG RAN WG1 Meeting #87, R1-1611808, "Considerations of NR SRS design", Nov. 2016.
(Continued)

*Primary Examiner* — Tejis Daya
(74) *Attorney, Agent, or Firm* — Seed IP Law Group LLP

(57) ABSTRACT

In the multiple short sequence based SRS, multiple items of sequence data having a short sequence length corresponding to a partial band are used for transmitting SRS in discontinuous bands. In the multiple short sequence based SRS, a terminal specifies a frequency domain to be used for transmitting a reference signal using predetermined sequence data, applies a phase shift index associated with the specified frequency domain to the reference signal, and transmits the reference signal to which the phase shift index is applied by using the specified frequency domain.

18 Claims, 14 Drawing Sheets

(58) Field of Classification Search
CPC ............... H04J 13/0025; H04J 13/107; H04J 2013/0081; H04J 13/0062; H04J 13/0066; H04W 72/04

See application file for complete search history.

(56) References Cited

U.S. PATENT DOCUMENTS

| | | | |
|---|---|---|---|
| 2010/0008333 A1* | 1/2010 | Kim .................. | H04L 5/0053 370/336 |
| 2011/0110357 A1 | 5/2011 | Chung et al. | |
| 2011/0124359 A1 | 5/2011 | Shimomura | |
| 2011/0164489 A1* | 7/2011 | Papasakellariou .... | H04L 5/0053 370/431 |
| 2012/0106471 A1 | 5/2012 | Behravan et al. | |
| 2012/0287877 A1 | 11/2012 | Han et al. | |
| 2012/0300740 A1 | 11/2012 | Iwai et al. | |
| 2013/0022012 A1 | 1/2013 | Lee et al. | |
| 2013/0028309 A1 | 1/2013 | Park et al. | |
| 2014/0050182 A1 | 2/2014 | Iwai et al. | |
| 2015/0092723 A1 | 4/2015 | Ahn et al. | |
| 2015/0195069 A1* | 7/2015 | Yi .................. | H04L 5/0053 370/329 |
| 2015/0215942 A1 | 7/2015 | Han et al. | |
| 2016/0057757 A1* | 2/2016 | Papasakellariou .... | H04L 5/0053 370/335 |
| 2016/0226649 A1 | 8/2016 | Papasakellariou et al. | |
| 2017/0041105 A1* | 2/2017 | Yamamoto .............. | H04L 1/16 |
| 2017/0156138 A1* | 6/2017 | Yamamoto ............ | H04L 1/1858 |
| 2019/0007175 A1* | 1/2019 | Kwak .................. | H04L 5/0053 |

FOREIGN PATENT DOCUMENTS

| | | |
|---|---|---|
| JP | 2009-535936 A | 10/2009 |
| JP | 2013-515427 A | 5/2013 |
| JP | 2013-520862 A | 6/2013 |
| WO | 2011/099283 A1 | 8/2011 |

OTHER PUBLICATIONS

3GPP TSG RAN1 Meeting #87, R1-1613470, "WF on SRS transmission for NR", Nov. 2016.

The Extended European Search Report dated Nov. 27, 2019 for the related European Patent Application No. 17890629.3.

Intel Corporation: "On SRS for NR", 3GPP Draft; R1-1612580, 3$^{rd}$ Generation Partnership Project (3GPP), Mobile Competence Centre; 650, Route Des Lucioles, F-06921 Sophia-Antipolis Cedex; France, vol. RAN WG1, No. Reno Nevada, USA; Nov. 14, 2016-Nov. 18, 2016 Nov. 13, 2016 (Nov. 13, 2016), XP0561176525.

International Search Report of PCT application No. PCT/JP2017/036299 dated Dec. 19, 2017.

* cited by examiner

| Case | RU#0 | RU#2 | RU#4 | RU#6 | CM[dB] |
|------|------|------|------|------|--------|
| A    | 2    | 2    | 2    | 2    | 5.9    |
|      | 0    | 0    | 0    | 0    | 5.8    |
|      | 5    | 4    | 3    | 2    | 5.0    |
|      | 3    | 4    | 5    | 6    | 5.0    |
| B    | 8    | 6    | 4    | 2    | 4.7    |
|      | 0    | 3    | 6    | 9    | 4.4    |
|      | 2    | 2    | 11   | 11   | 4.6    |
| C    | 2    | 11   | 2    | 11   | 4.6    |
|      | 2    | 2    | 2    | 1    | 4.2    |
| D    | 2    | 7    | 7    | 7    | 4.2    |

| CS offset | RU#0 | RU#1 | RU#2 | RU#3 | RU#4 | RU#5 | RU#6 |
|---|---|---|---|---|---|---|---|
| 0 | 0 | 2 | 1 | 0 | 2 | 1 | ⋮ |
| 1 | 1 | 0 | 2 | 1 | 0 | 2 | |
| 2 | 2 | 1 | 0 | 2 | 1 | 0 | |

FIG. 13

| CS offset | RU#0 | RU#1 | RU#2 | RU#3 | RU#4 | RU#5 | RU#6 |
|---|---|---|---|---|---|---|---|
| 0 | 0 | 0 | 2 | 2 | 1 | 1 | ... |
| 1 | 1 | 1 | 0 | 0 | 2 | 2 | |
| 2 | 2 | 2 | 1 | 1 | 0 | 0 | |

Related Art

TERMINAL, BASE STATION, AND COMMUNICATION METHOD FOR REFERENCE SIGNALS WITH PHASE SHIFT INDEXES

TECHNICAL FIELD

The present disclosure relates to a terminal, a base station, and a communication method.

BACKGROUND ART

In the standardizing of the fifth-generation mobile communication system (5G), a new radio access technology (NR (New RAT)), which does not necessarily have backward compatibility with LTE/LTE-Advanced, which is the current system, is being discussed in 3GPP.

In LTE/LTE-Advanced, a terminal (may also be called "UE (User Equipment)") transmits a Sounding Reference Signal (hereinafter called "SRS") in a radio resource allocated by a base station (may also be called "eNB" or "gNB"). The base station measures the quality of the received SRS to estimate the uplink channel quality in the SRS transmit band. LTE/LTE-Advanced also states that SRS is transmitted in a continuous band to regulate CM (Cubic Metric)/PAPR (Peak-to-Average Power Ratio).

In NR, simultaneously transmitting of SRS in multiple partial bands 100 (that is, transmitting SRS in discontinuous bands) as shown in FIG. 14 is being discussed (see NPL 1, for example).

In NR, using of a wider system band than that in LTE/LTE-Advanced is being examined. If a wide bandwidth is used for transmitting SRS, terminals located near cell edges become short of transmission power. Discontinuous transmission of SRS by using partial bands of the system band may make it possible to transmit SRS in a wide band while using less transmission power of terminals. This allows a base station to quickly estimate the uplink channel quality in a wide band.

The multiple short sequence based SRS that uses multiple items of sequence data having a short sequence length corresponding to a partial band to transmit SRS in discontinuous bands is being examined (see NPL 2, for example). As the SRS code sequence, Zadoff-Chu (ZC) sequence data used for SRS in LTE/LTE-Advanced is used. The sequence length of ZC sequence data is set to be a length corresponding to one partial band 100. To perform simultaneous transmission in multiple partial bands, plural items of ZC sequence data are used to transmit SRS.

In the multiple short sequence based SRS, in each partial band 100, different cyclic shift (CS) indexes (or phase shift indexes) for different terminals are set. With this configuration, if the partial bands 100 have the same size, orthogonalization of SRSs, which are transmitted from plural terminals having different transmit bands, can be conducted in units of partial bands 100 (see FIG. 14). The multiple short sequence based SRS thus implements high flexibility in performing SRS frequency scheduling.

CITATION LIST

Non Patent Literature

NPL 1: R1-1613470, CATT and others, "WF on SRS transmission for NR", RAN1 #87, November 2016

NPL 2: R1-1611808, LG and others, "Considerations on NR SRS design", RAN1 #87, November 2016

SUMMARY OF INVENTION

In the multiple short sequence based SRS, in order to allow plural terminals to implement flexible orthogonalization of SRSs by using CS, it is necessary to inform each terminal of a CS index used for each partial band 100 (see FIG. 15). This increases overhead for supplying CS index information.

One non-limiting embodiment of the present disclosure facilitates providing a terminal, a base station, and a communication method that are capable of reducing overhead of signaling for supplying CS index information in the multiple short sequence based SRS.

A terminal according to an embodiment of the present disclosure includes a circuit and a transmitter. The circuit specifies a frequency domain to be used for transmitting a reference signal using predetermined sequence data and applies a phase shift index associated with the specified frequency domain to the reference signal. The transmitter transmits the reference signal to which the phase shift index is applied by using the specified frequency domain.

A base station according to an embodiment of the present disclosure includes a receiver and a circuit. The receiver receives a reference signal using predetermined sequence data in a specific frequency domain. The circuit compares a base signal and the reference signal with each other. The base signal is a signal to which a phase shift index associated with the specific frequency domain is applied.

A communication method according to an embodiment of the present disclosure includes: specifying a frequency domain to be used for transmitting a reference signal using predetermined sequence data and applying a phase shift index associated with the specified frequency domain to the reference signal; and transmitting the reference signal to which the phase shift index is applied by using the specified frequency domain.

A communication method according to an embodiment of the present disclosure includes: receiving a reference signal using predetermined sequence data in a specific frequency domain; and comparing a base signal and the reference signal with each other. The base signal is a signal to which a phase shift index associated with the specific frequency domain is applied.

It should be noted that these general or specific embodiments may be implemented as a system, a device, a method, an integrated circuit, a computer program, a storage medium, or any selective combination thereof.

According to an embodiment of the present disclosure, it is possible to reduce overhead of signaling for supplying CS index information in the multiple short sequence based SRS.

Additional benefits and advantages of an embodiment of the present disclosure will become apparent from the specification and drawings. The benefits and/or advantages may be individually obtained by the various embodiments and features of the specification and drawings, which need not all be provided in order to obtain one or more of such features.

BRIEF DESCRIPTION OF DRAWINGS

FIG. 11 illustrates combinations of CS indexes that increase CM.

FIG. 12 illustrates the allocation of CS indexes according to CS index calculation method 3.

FIG. 13 illustrates the allocation of CS indexes according to CS index calculation method 4.

DESCRIPTION OF EMBODIMENTS

Figure 1:
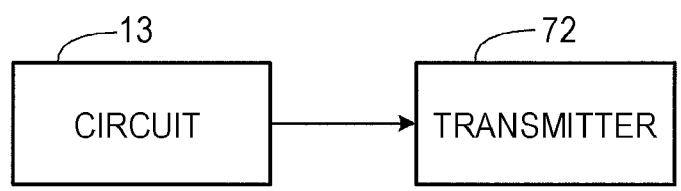
FIG. 1 illustrates the configuration of a terminal according to an embodiment of the disclosure.

Embodiments of the present disclosure will be described below in detail with reference to the drawings. In the following description, when referring to the same group of elements by distinguishing them from each other, reference numerals, such as "CS group 342A" and "CS group 342B", may be used. When referring to the same group of elements without distinguishing them from each other, part of a reference numeral common to the elements, such as "CS group 342", may be used. The number may be represented by "#".

Figure 3:
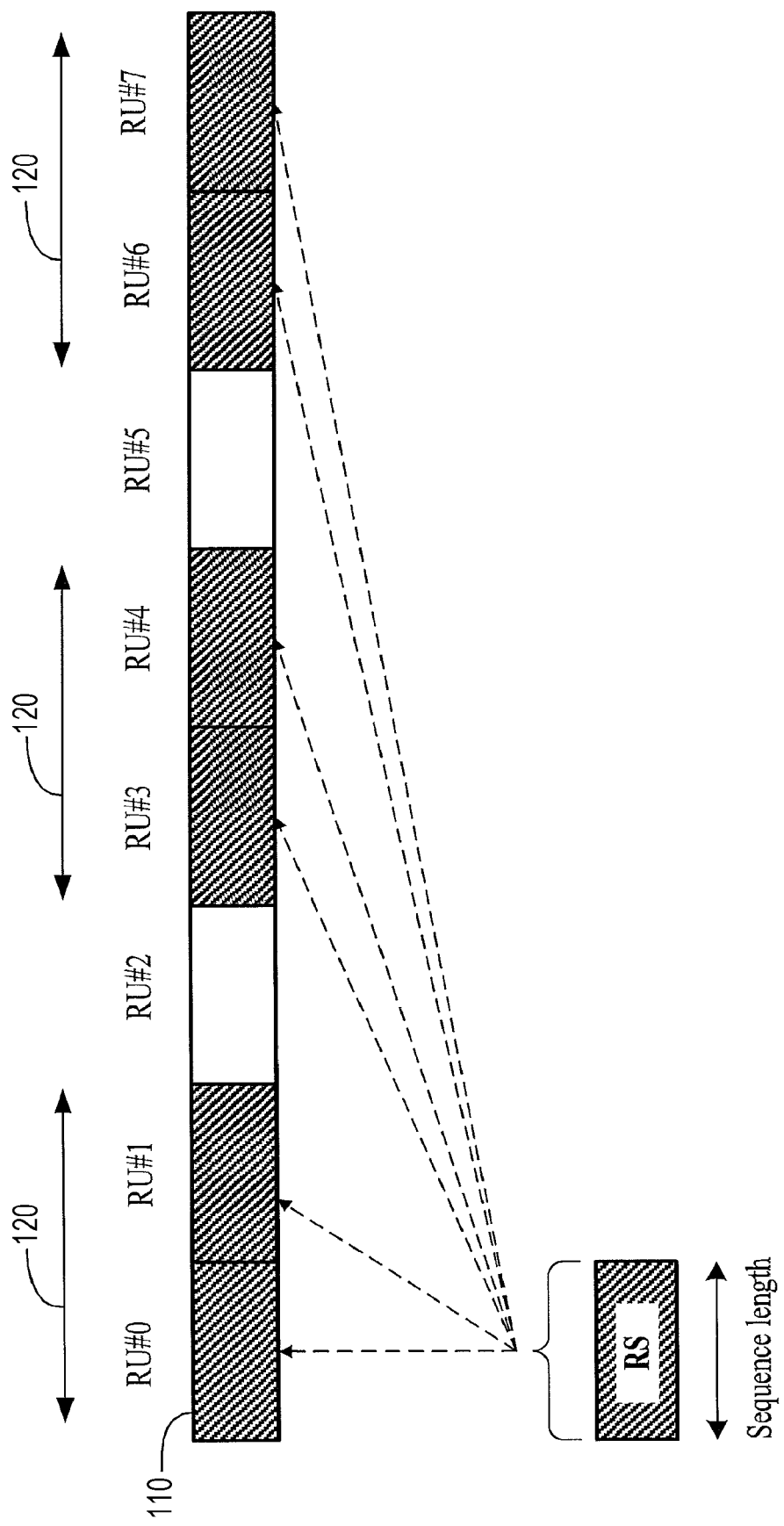
FIG. 3 is a diagram for explaining how a partial band and RU are defined.

In the present disclosure, in the multiple short sequence based SRS, the frequency resource unit which corresponds to the sequence length of one item of code sequence (such as ZC sequence) data is called a resource unit (RU). One RU is constituted by one or more resource blocks (RBs). A continuous band including one or more RUs for transmitting SRS is called a partial band. The partial band size and the RU size may be changed in accordance with the cell, the service type of NR (eMBB, URLLC, mMTC), or the carrier frequency. In the embodiments, a description will be given, assuming that the RU size and the partial band size are equal to each other. However, as shown in FIG. 3, the size of a partial band 120 may be larger than that of a RU 110.

In the present disclosure, RU numbers are assigned in the following manner, for example. In a grid of RUs divided from the system band by the RU size, numbers are sequentially assigned to the RUs in the order of frequency.

<Overview of Communication System>

A communication system according to each embodiment of the disclosure includes a base station 10 and a terminal 12.

FIG. 1 is a block diagram illustrating the configuration of the terminal 12 according to the embodiments of the disclosure. In the terminal 12 shown in FIG. 1, a circuit 13 specifies a frequency domain to be used for transmitting a reference signal using predetermined sequence data, and applies the phase shift index associated with the specified frequency domain to the reference signal. A transmitter 72 transmits the reference signal to which the phase shift index is applied by using the specified frequency domain.

Figure 2:
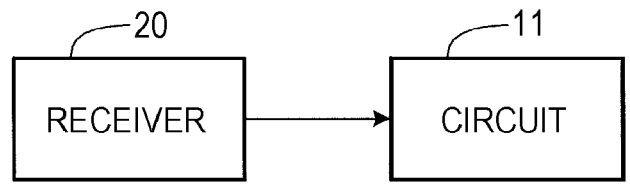
FIG. 2 illustrates the configuration of a base station according to an embodiment of the disclosure.

FIG. 2 is a block diagram illustrating the configuration of the base station 10 according to the embodiments of the disclosure. In the base station 10 shown in FIG. 2, a receiver 20 receives a reference signal using predetermined sequence data in a specific frequency domain. A circuit 11 applies the phase shift index associated with the specific frequency domain to the reference signal.

First Embodiment

The configuration of the base station 10 and that of the terminal 12 in the multiple short sequence based SRS will be described below.

<Configuration of Base Station>

Figure 4:
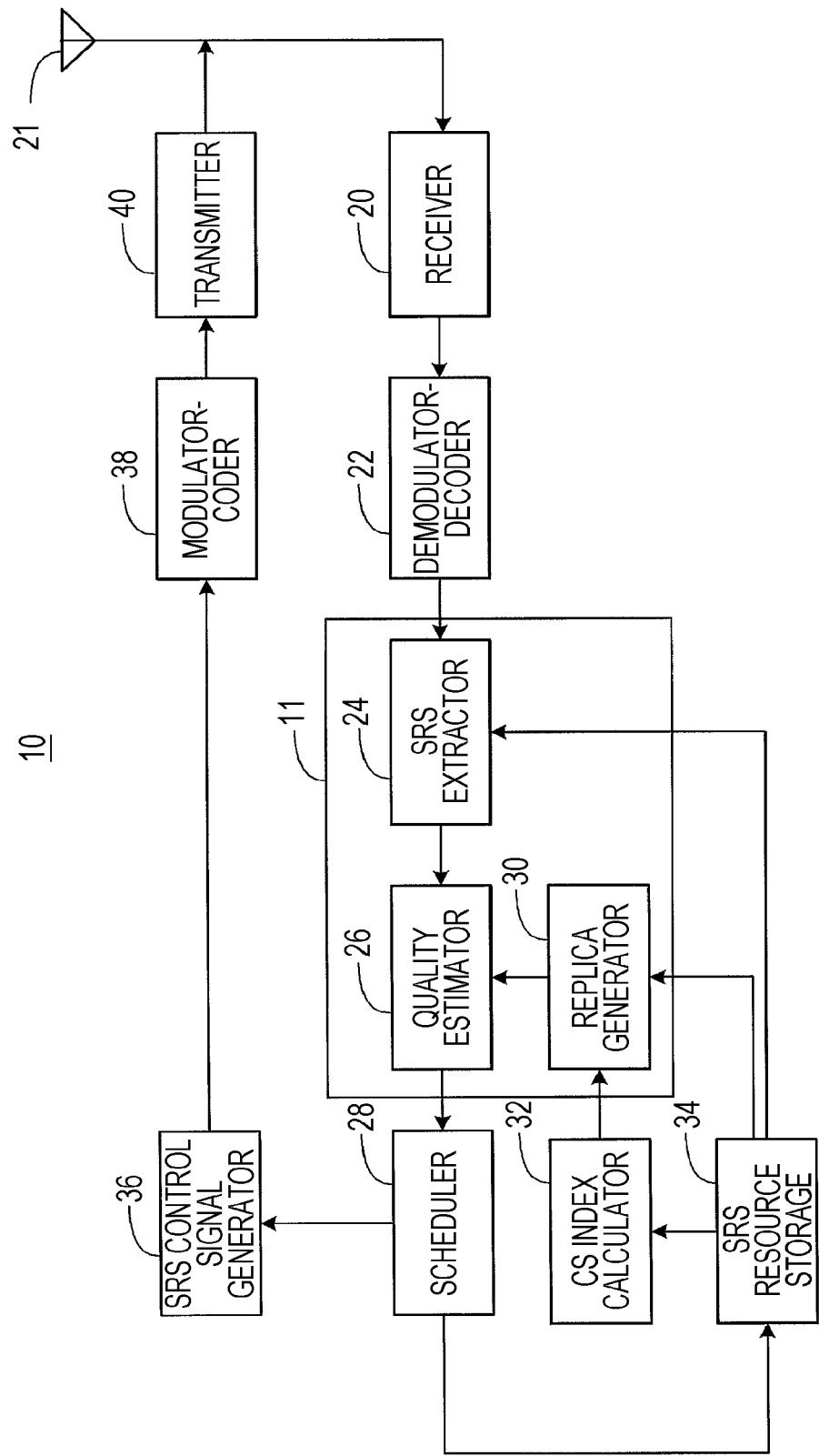
FIG. 4 illustrates the configuration of a base station in accordance with a first embodiment.

FIG. 4 is a block diagram illustrating the configuration of the base station 10 according to this embodiment in the multiple short sequence based SRS. In FIG. 4, the base station 10 includes an antenna 21, the receiver 20, a demodulator-decoder 22, a SRS extractor 24, a quality estimator 26, a scheduler 28, a replica generator 30, a CS index calculator 32, a SRS resource storage 34, a SRS control signal generator 36, a modulator-coder 38, and a transmitter 40. The functions of the SRS extractor 24, the quality estimator 26, and the replica generator 30 may be included in the circuit 11 shown in FIG. 2.

The receiver 20 executes receive processing, such as down-conversion and ND conversion, on a radio signal received from the terminal 12 via the antenna 21. The receiver 20 then outputs the signal subjected to receive processing to the demodulator-decoder 22.

The demodulator-decoder 22 demodulates and decodes the signal received from the receiver 20. The demodulator-decoder 22 then outputs the demodulated and decoded signal to the SRS extractor 24.

The SRS extractor 24 extracts SRS from the signal received from the demodulator-decoder 22, based on SRS resource information received from the SRS resource storage 34. The SRS extractor 24 outputs the extracted SRS to the quality estimator 26.

The SRS resource information is information required for transmitting SRS by the terminal 12. For example, the SRS resource information includes information concerning code sequence data, such as the RU number, RU size, and CS offset value. The base station 10 is not always required to supply all the items of information in the SRS resource information. The base station 10 may inform the terminal 12 of part of the SRS resource information, such as the RU size, in advance, as information based on a cell unit.

The SRS resource storage 34 stores the SRS resource information sent to the terminal 12. The SRS resource information sent to the terminal 12 is output from the scheduler 28.

The CS index calculator 32 calculates a CS index for each RU in a SRS allocated band, based on the RU number and the CS offset value included in the SRS resource information received from the SRS resource storage 34. The CS index calculator 32 outputs the calculated CS index for each RU to the replica generator 30. Details of the calculation method for CS indexes by using the RU numbers will be discussed later.

The replica generator 30 identifies the RU size based on the SRS resource information received from the SRS resource storage 34, and generates a replica signal corresponding to the RU size by using SRS code sequence data, such as ZC sequence data. Based on the CS index for each RU received from the CS index calculator 32, the replica generator 30 applies a corresponding CS (that is, phase shift)

to the generated replica signal so as to generate a replica signal to which the CS is applied. The replica generator 30 outputs the replica signal to which the CS is applied to the quality estimator 26. The replica signal may be called a base signal.

The quality estimator 26 performs correlation calculation to compare the SRS extracted by the SRS extractor 24 and the replica signal to which the CS is applied output from the replica generator 30 so as to estimate the quality in the uplink channel from the terminal 12 to the base station 10. This estimation result will be called the quality estimation result. The correlation calculation is performed for each RU, that is, for each code sequence length. The quality estimator 26 outputs the quality estimation result to the scheduler 28.

The scheduler 28 conducts data scheduling (MCS setting, frequency resource allocation, and transmission power control), based on the quality estimation result received from the quality estimator 26. The scheduler 28 determines SRS resource information for each terminal 12 by taking the frequency allocated to the data into consideration. The scheduler 28 then outputs the determined SRS resource information to the SRS control signal generator 36 and the SRS resource storage 34.

The SRS control signal generator 36 generates a control signal for supplying the SRS resource information received from the scheduler 28 to the terminal 12. The SRS control signal generator 36 outputs the generated control signal to the modulator-coder 38.

The modulator-coder 38 modulates and codes the control signal received from the SRS control signal generator 36 and outputs the control signal to the transmitter 40.

The transmitter 40 executes transmit processing, such as D/A conversion, up-conversion, and amplification, on the signal received from the modulator-coder 38. The transmitter 40 then transmits the radio signal subjected to transmit processing to the terminal 12 via the antenna 21.

<Configuration of Terminal>

Figure 5:
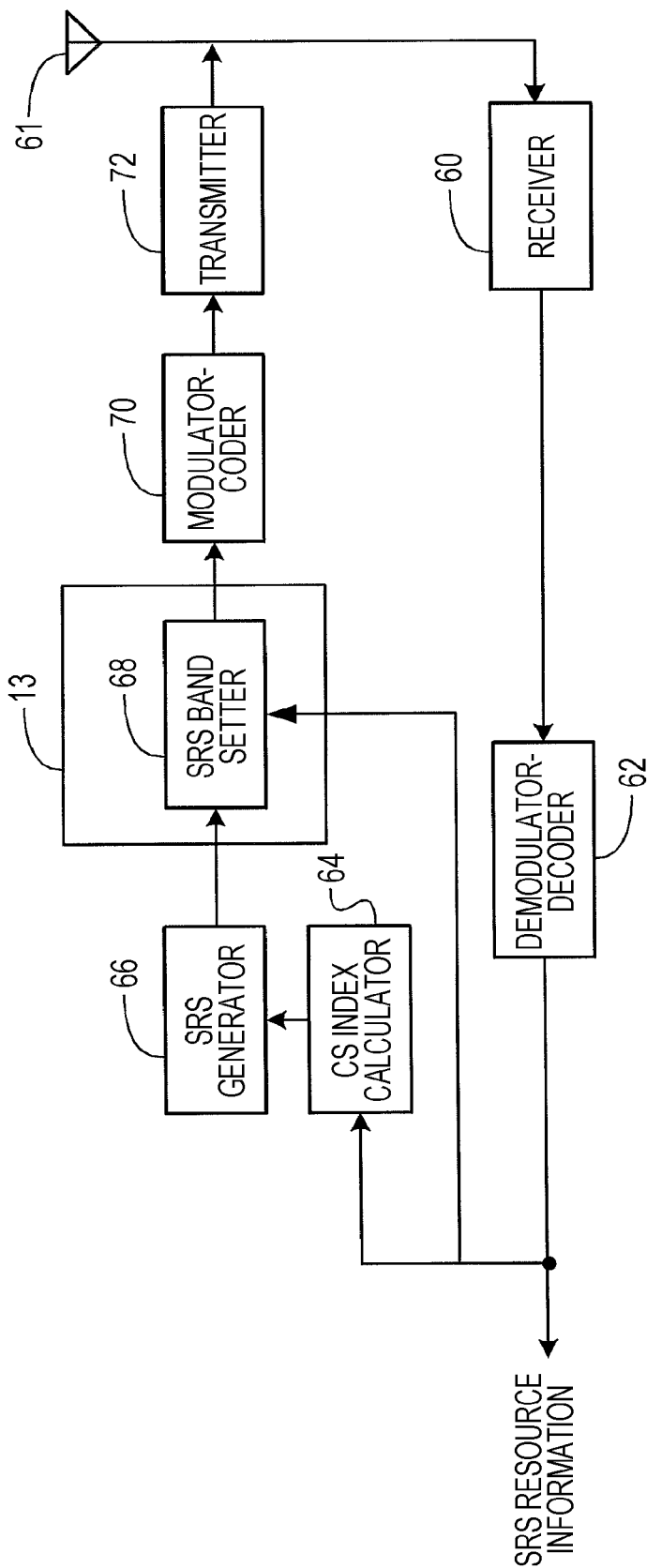
FIG. 5 illustrates the configuration of a terminal in accordance with the first embodiment.

FIG. 5 is a block diagram illustrating the configuration of the terminal 12 according to this embodiment in the multiple short sequence based SRS. In FIG. 5, the terminal 12 includes an antenna 61, a receiver 60, a demodulator-decoder 62, a CS index calculator 64, a SRS generator 66, a SRS band setter 68, a modulator-coder 70, and the transmitter 72. The functions of the SRS band setter 68 may be included in the circuit 13 shown in FIG. 1.

The receiver 60 executes receive processing, such as down-conversion and ND conversion, on a signal received via the antenna 61. The receiver 60 then outputs the signal subjected to receive processing to the demodulator-decoder 62.

The demodulator-decoder 62 demodulates and decodes the signal received from the receiver 60 and extracts SRS resource information transmitted from the base station 10 from the demodulated and decoded signal. The demodulator-decoder 62 then outputs the extracted SRS resource information to the CS index calculator 64 and the SRS band setter 68.

The SRS band setter 68 maps SRS received from the SRS generator 66 onto the RU number included in the SRS resource information. The SRS band setter 68 outputs a signal generated by mapping SRS onto the RU number to the modulator-coder 70.

The CS index calculator 64 performs processing similar to that of the CS index calculator 32 of the base station 10. That is, the CS index calculator 64 calculates a CS index for each RU, based on the RU number and the CS offset value included in the SRS resource information. The CS index calculator 64 outputs the calculated CS index to the SRS generator 66.

The SRS generator 66 generates SRS by using code sequence (ZC sequence) data having a sequence length corresponding to the RU size included in the SRS resource information. The SRS generator 66 applies cyclic shift (phase shift) based on the CS index calculated for a corresponding RU by the CS index calculator 64 to the generated SRS. The SRS generator 66 outputs the SRS to which the cyclic shift is applied to the SRS band setter 68.

The modulator-coder 70 modulates and codes the signal received from the SRS band setter 68, and outputs the modulated and coded signal to the transmitter 72.

The transmitter 72 executes transmit processing, such as D/A conversion, up-conversion, and amplification, on the signal received from the modulator-coder 70. The transmitter 72 then transmits the radio signal subjected to transmit processing to the base station 10 via the antenna 61.

<Operations of Base Station and Terminal>

Operations of the base station 10 and the terminal 12 configured as described above will be described below in detail.

Figure 6:
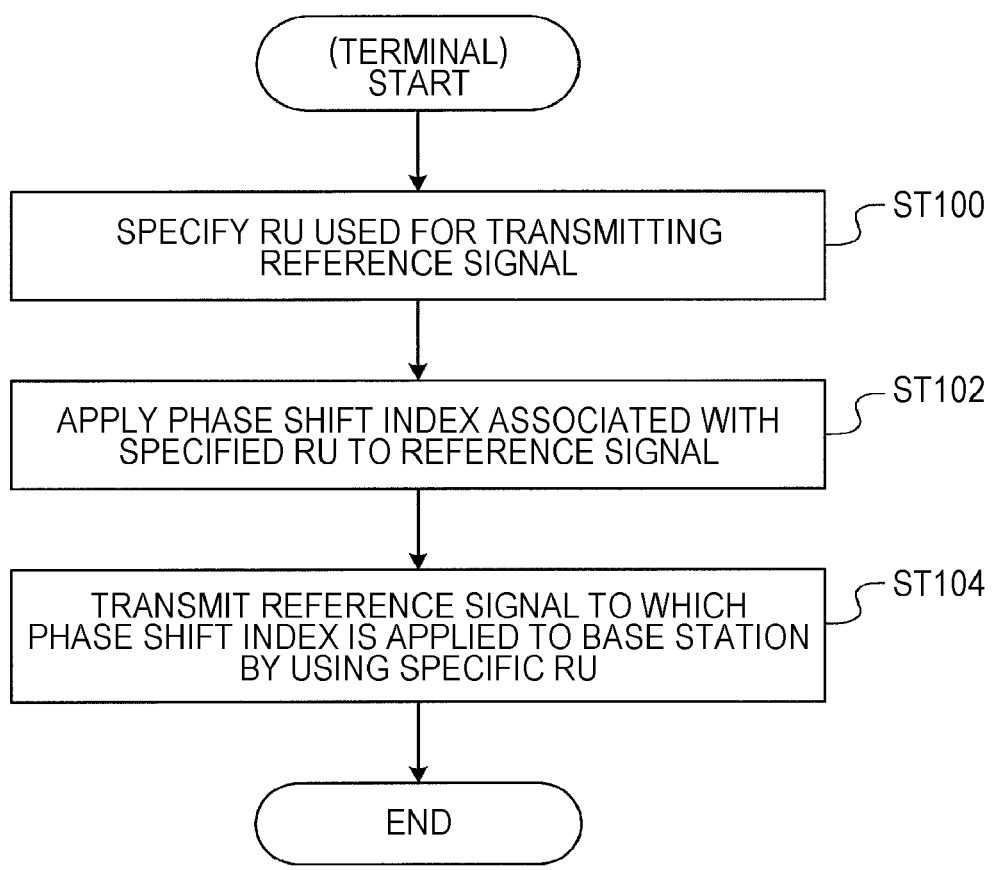
FIG. 6 illustrates an operation of the terminal according to the first embodiment.
Figure 7:
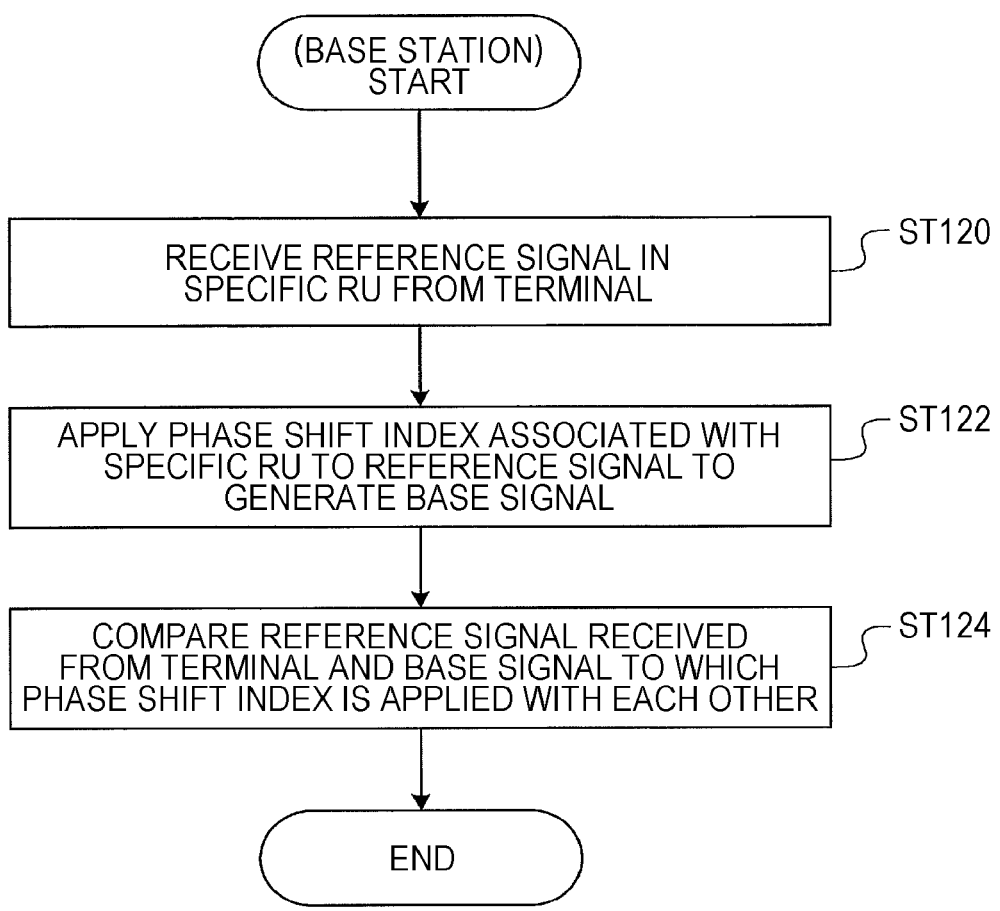
FIG. 7 illustrates an operation of the base station according to the first embodiment.

FIG. 6 is a flowchart illustrating an operation of the terminal 12. FIG. 7 is a flowchart illustrating an operation of the base station 10.

The terminal 12 specifies a RU (that is, a frequency domain) for transmitting a reference signal (ST100). The terminal 12 applies the phase shift index associated with the specified RU to the reference signal (that is, a signal including SRS) (ST102). The terminal 12 then transmits the reference signal to which the phase shift index is applied to the base station 10 by using the specified RU (ST104).

The base station 10 receives a reference signal in a specific RU from the terminal 12 (ST120). The base station 10 then applies the phase shift index associated with this specific RU to the reference signal to generate a base signal (ST122), and compares the reference signal received from the terminal 12 and the base signal to which the phase shift index is applied with each other (ST124). As a result of comparing the reference signal and the base signal, the base station 10 estimates the quality of the uplink channel from the terminal 12 to the base station 10.

<CS Index Calculation Method>

Details of methods for calculating CS based on the RU number by the CS index calculator of each of the terminal 12 and the base station 10 will be described below in detail.

<CS Index Calculation Method 1>

Figure 8:
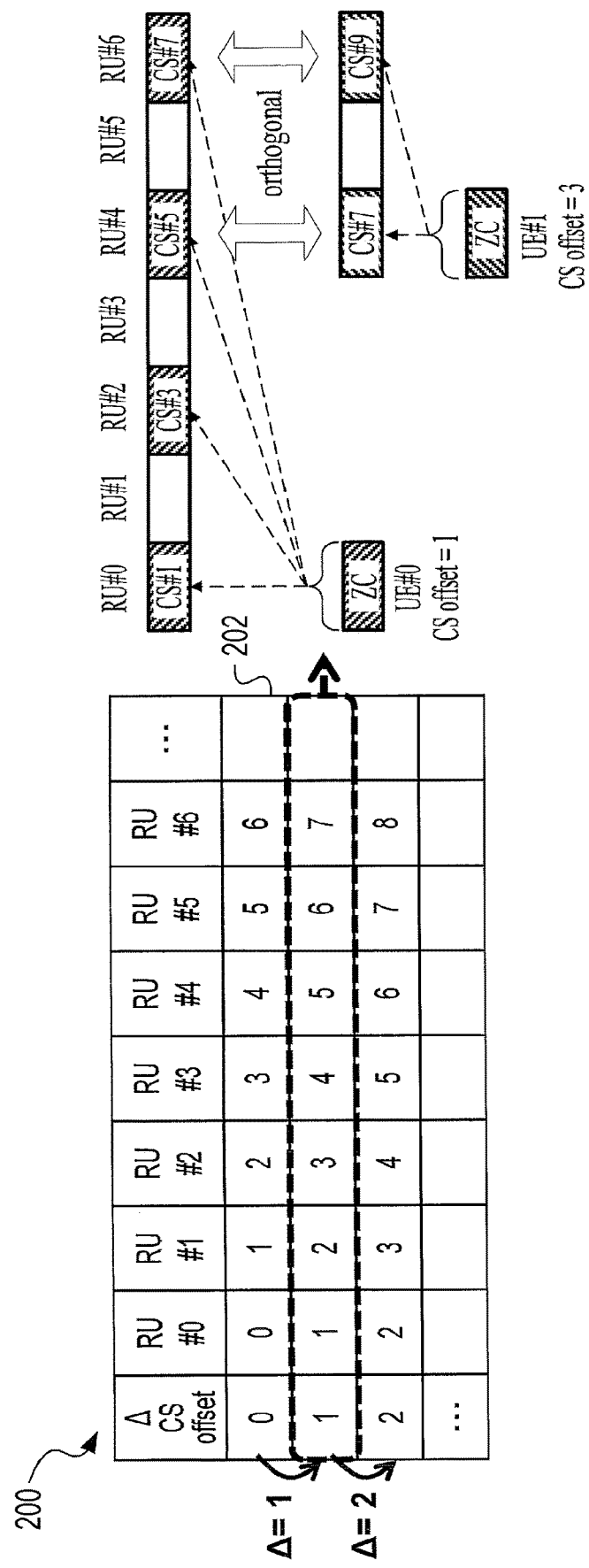
FIG. 8 illustrates CS calculation method 1.

FIG. 8 illustrates CS calculation method 1.

In CS calculation method 1, the frequency resource RU number and the CS index are uniquely associated with each other, and the base station 10 supplies a CS offset value to each terminal 12. In this case, the base station 10 supplies different CS offset values to the terminals 12 which multiplex SRSs regardless of the number of partial bands for each terminal 12.

Based on the RU number of each partial band and the CS offset value, the base station 10 and the terminal 12 calculate the CS index for a corresponding RU number. The base station 10 may dynamically inform the terminal 12 of the CS offset value by using DCI (Downlink Control Information) or semi-statically inform the terminal 12.

In a row 202 of a table 200 shown in FIG. 8, CS index "0" is uniquely associated with RU #0, CS index "1" is uniquely associated with RU #1, . . . , and CS index "4" is uniquely associated with RU #4. The base station 10 has already informed UE #0 of CS offset "1" and also informed UE #1 of CS offset "3". When transmitting SRS in RU #4, UE #0 adds CS offset "1", which is assigned to UE #0, to CS index "4" associated with RU #4 so as to calculate cyclic shift index (phase shift index) "5" for SRS. When transmitting SRS in RU #4, UE #1 adds CS offset "3", which is assigned to UE #1, to CS index "4" associated with RU #4 so as to calculate cyclic shift index (phase shift index) "7" for SRS. Different cyclic shift indexes are applied to SRS of UE #0 and SRS of UE #1 to be transmitted in the same RU #4, so that the base station 10 can distinguish SRS of UE #0 and SRS of UE #1 from each other.

In this manner, by uniquely associating the frequency resource RU number and the CS index with each other, the base station 10 merely informs the terminal 12 of the CS offset value without the need to supply the CS index for each partial band to the terminal 12. It is thus possible to reduce overhead of signaling from the base station 10 to the terminal 12.

Instead of the base station 10 informing the terminal 12 of the CS offset value, the CS offset value may be calculated from the ID (RNTI (Radio Network Temporary ID), for example) of the terminal 12.

Calculating the CS offset value from the ID of the terminal 12 eliminates the need for the base station 10 to inform the terminal 12 of the CS offset value. This can reduce overhead of signaling from the base station 10 to the terminal 12 to be even smaller. In this case, the base station 10 conducts scheduling so that terminals 12 having different CS offset values can allocate SRSs to the same RU.

As described above, according to this embodiment, by uniquely associating the frequency resource RU number and the CS index with each other, it is possible to reduce overhead of signaling for supplying CS index information in the multiple short sequence based SRS.

Second Embodiment

As discussed above, the use of CS calculation method 1 makes it possible to reduce overhead of signaling for supplying CS index information.

In the multiple short sequence based SRS, however, CM or PAPR may become higher depending on the combination of CS indexes used for RUs.

Figure 9:
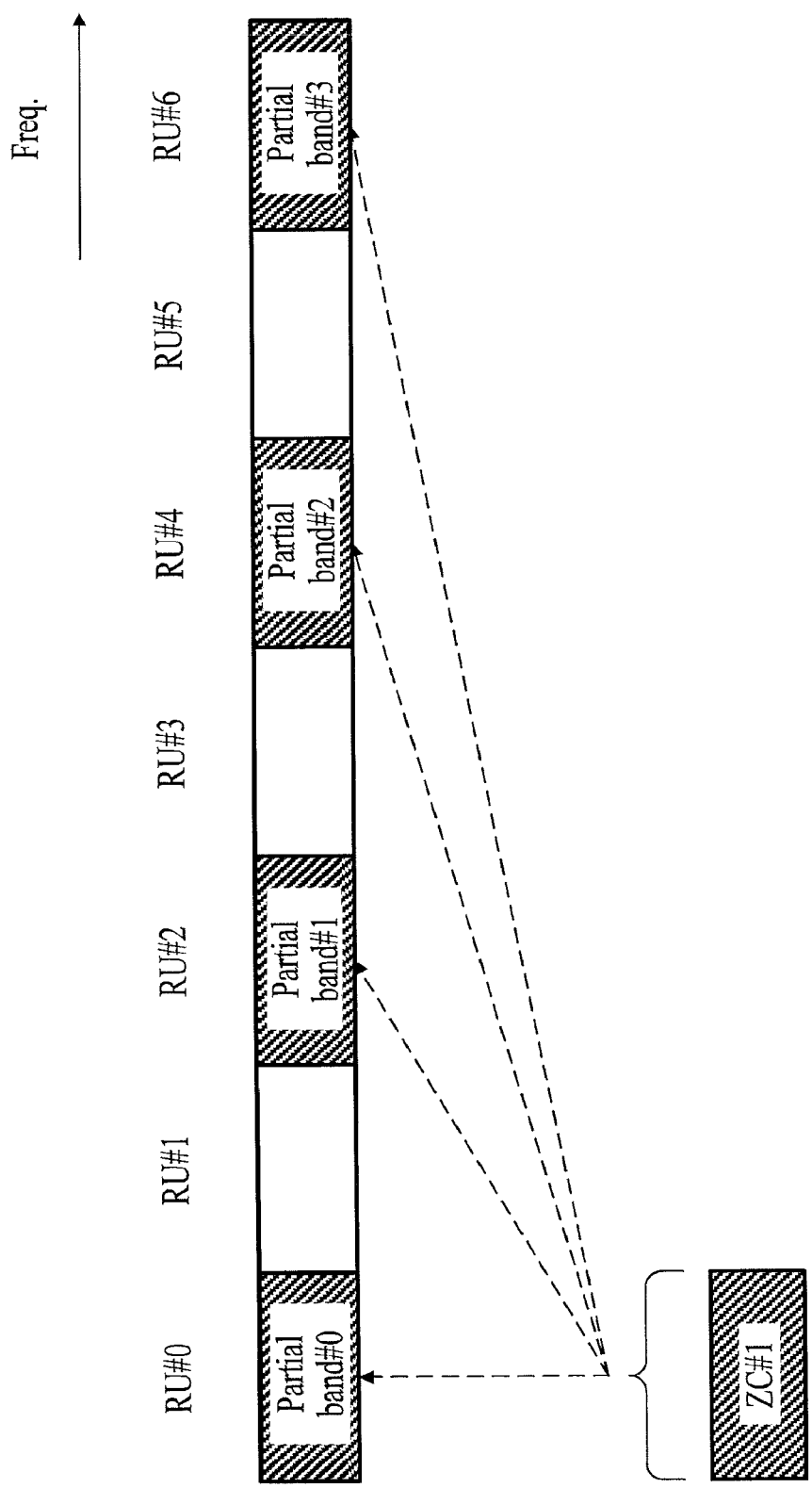
FIG. 9 illustrates an example of SRS allocation used for CM evaluation.

FIG. 9 illustrates an example of SRS allocation used for CM evaluation.

In FIG. 9, the number of partial bands is "4", ZC sequence number is "1", RU size is 4RBs (1RB=12 subcarriers), partial band interval is 4RBs, and RUs for transmitting SRS are RU #0, RU #2, RU #4, and RU #6.

Figure 10:
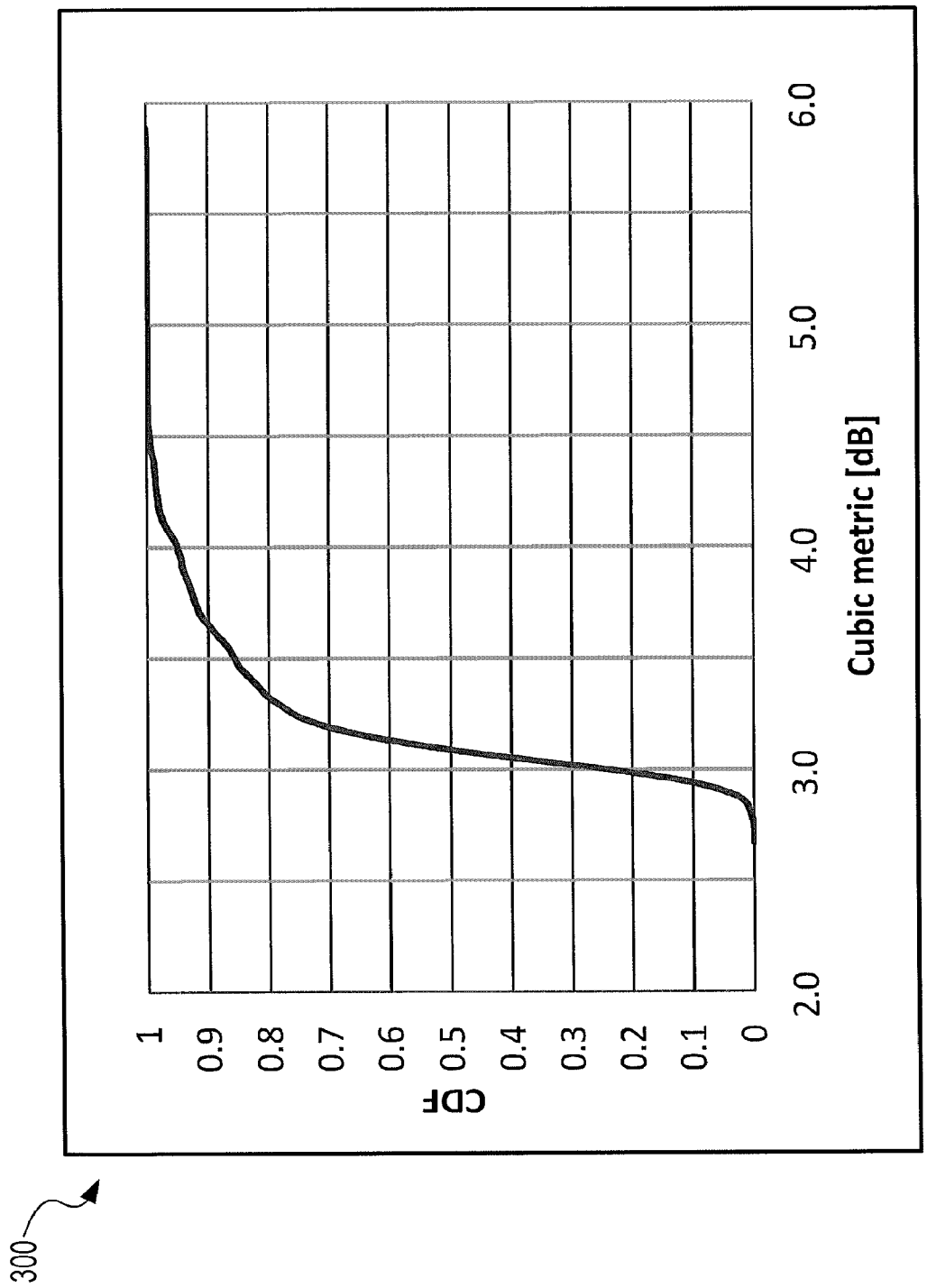
FIG. 10 illustrates the simulation results of CM evaluation.
Figure 14:
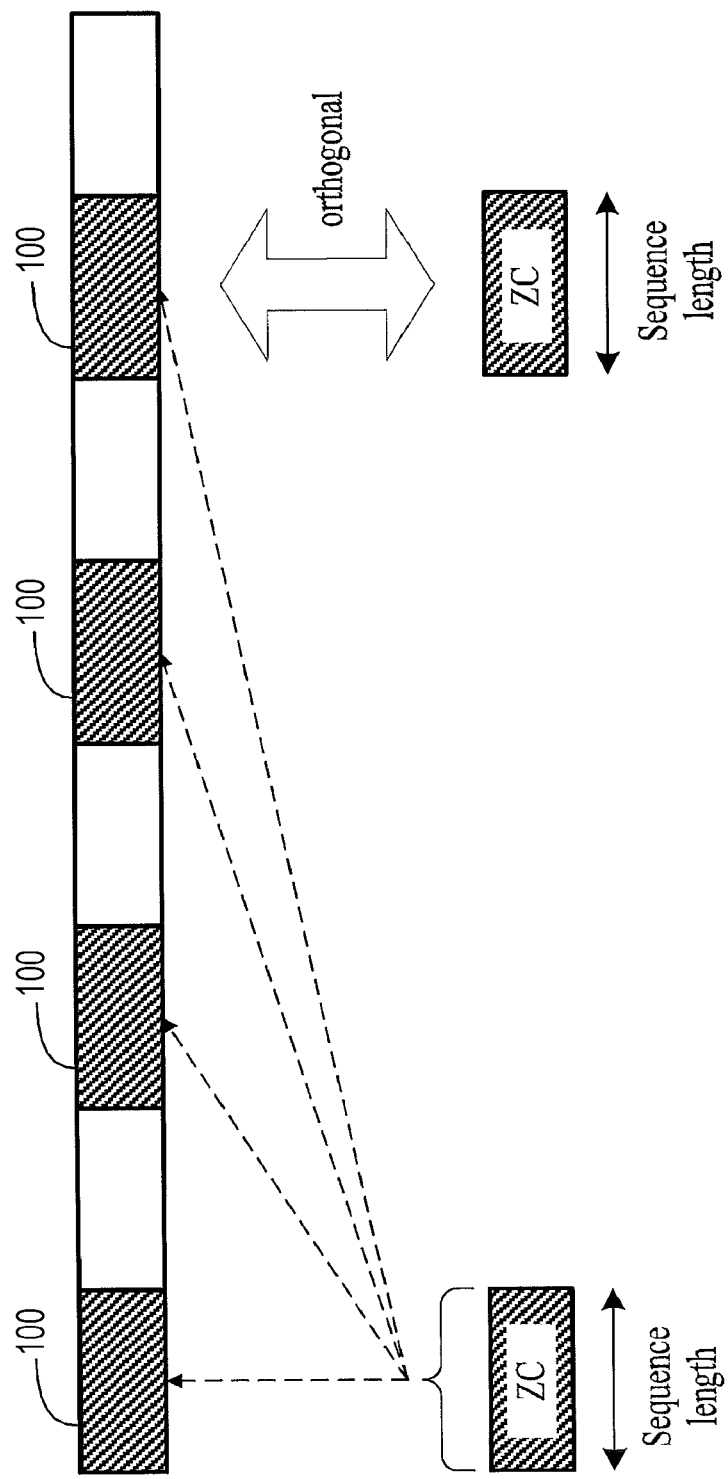
FIG. 14 is a diagram for explaining the multiple short sequence based SRS.
Figure 15:
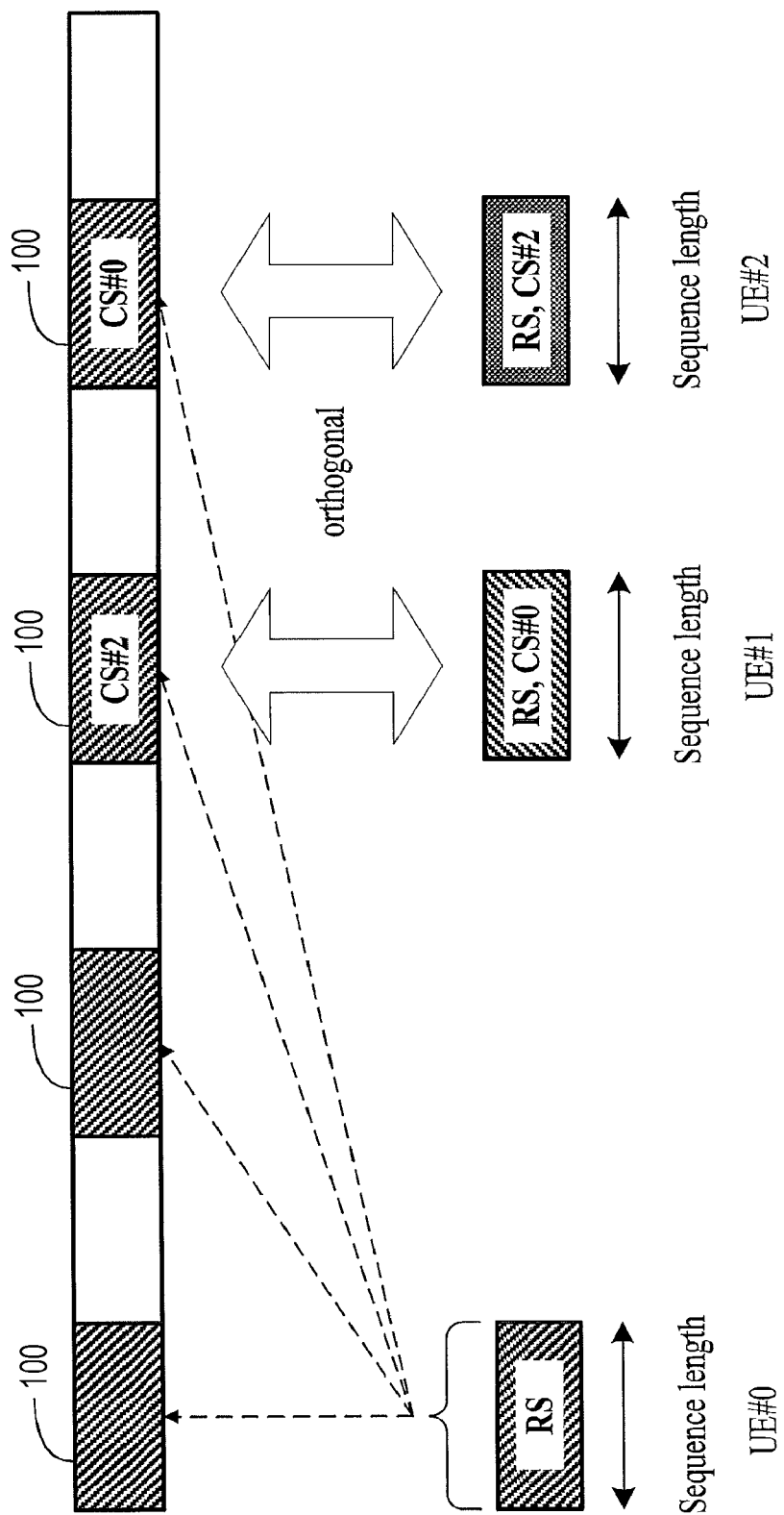
FIG. 15 is a diagram for explaining code orthogonalization using CS in units of partial bands.

FIG. 10 is a graph 300 illustrating the simulation results of CM evaluation by using the combinations of all CS indexes in the SRS allocation in FIG. 9.

CM of OFDM data is 4.0 dB. The graph 300 shows that about 5% of the combinations of CS indexes make CM of SRS higher than that of OFDM data.

FIG. 11 is a table 320 illustrating an example of combinations of CS indexes that make CM particularly high among the combinations of all the CS indexes used for RUs.

When the allocation patterns of CS indexes to RUs come under the following cases A through D, as shown in the example of the table 320 of FIG. 11, CM becomes high.

Case A: The same CS index is used for all RUs (or all partial bands).
Case B: CS indexes used for adjacent RUs (or adjacent partial bands) are monotonically changed.
Case C: The same CS index is used for the first half (lower frequency) or the second half (higher frequency) of RUs (or partial bands).
Case D: The same CS index is used for most (¾ or higher ratio according to the evaluation conditions) of all RUs (or all partial bands).

In a second embodiment, CS index calculation methods 2 through 4 that can reduce the occurrence of the above-described cases will be discussed. In the second embodiment, the configurations of the base station 10 and the terminal 12, the configuration in which the CS index and the frequency resource RU number are uniquely associated with each other, and the configuration in which the base station 10 supplies different CS offset values to terminals 12 that multiplex SRSs in the same band regardless of the number of partial bands of each terminal 12 are similar to those of the first embodiment.

The CS index calculation methods 2, 3, and 4 are different regarding how the RU number and the CS index are associated with each other. The CS index calculation methods 2, 3, and 4 will be discussed below.

<CS Index Calculation Method 2>

In the CS index calculation method 2, the CS index is randomly associated with the RU number.

A random CS index to be set for each RU number may be defined by using a predetermined pattern table in advance in accordance with the cell unit or the system specifications. Alternatively, a random CS index to be set for each RU number may be calculated by using predetermined a pseudorandom number according to the following equation 1.

$$CS(m,n) = \mathrm{mod}(PN(m) + \Delta(n), N_{CS}) \quad \text{(Equation 1)}$$

In equation 1, m is a RU number, n is a terminal number, $N_{CS}$ is the maximum number of CS ($N_{CS}=12$ in the case of LTE/LTE-Advanced), $CS(m,n)$ is the CS index for terminal #n and RU number #m, $PN(m)$ is the pseudorandom number (0 to $N_{CS}-1$ pseudorandom numbers) for RU number #m, and $\Delta(n)$ is the CS offset value for terminal #n.

According to the CS index calculation method 2, random setting of the CS index for each RU by using a pattern table or a pseudorandom number, for example, can reduce the probability of increasing CM in the multiple short sequence based SRS. Additionally, as in the CS index calculation method 1, the effect of reducing signaling overhead is also achieved.

<CS Index Calculation Method 3>

In the CS index calculation method 3, within a CS group constituted by continuous (or adjacent) RUs equal to the maximum number of CS ($N_{CS}$), different CS indexes are associated with the RUs.

FIG. 12 is a table 340 illustrating the allocation of the CS index according to the CS index calculation method 3.

The table 340 in FIG. 12 shows the following example of the association of the CS index with the RU. The maximum number of CS is "3". RU #0 through RU #2 belong to a CS group 342A, while RU #3 through RU #5 belong to a CS group 342B. In each CS group 342, different CS indexes are uniquely associated with the RUs.

The same pattern of CS indexes may be associated with different CS groups 342. Alternatively, different patterns of CS indexes may be associated with different CS groups 342. For example, different offset values ($\Delta_{group}$) may be used for different CS groups 342.

According to the CS index calculation method 3, different CS indexes are associated with the RUs within the same CS group. When SRSs are allocated to continuous (or adjacent) $N_{CS}$ RUs, the probability that the same CS index will be used within the band of the allocated SRSs is reduced. That is, the probability that case A, case C, and case D will occur is reduced. It is thus possible to decrease the probability that CM will become high. Additionally, as in the CS index calculation method 1, signaling overhead can also be reduced.

<CS Index Calculation Method 4>

In the CS index calculation method 4, as well as in the CS index calculation method 3, different CS indexes are associated with RUs within a CS group. In the CS index calculation method 4, however, a CS group is constituted, not by continuous RUs, but by RUs equal to the maximum number of CS ($N_{CS}$) formed at an interval of $N_{comb}$ RUs.

$N_{comb}$ is a predetermined partial band interval applied to the terminal 12. For example, if, for the purpose of reducing signaling, for example, the partial band interval is restricted to an interval of an even number of RUs, $N_{comb}$ is set to be 2.

FIG. 13 is a table 360 illustrating an example of the allocation of the CS index according to the CS index calculation method 4.

The table 360 in FIG. 13 shows the following example of the association of the CS index with the RU. $N_{comb}$=2, and $N_{CS}$=3. RU #0, RU #2, and RU #4 belong to a CS group 362A, while RU #1, RU #3, and RU #5 belong to a CS group 362B. In each CS group 362, different CS indexes are uniquely associated with the RUs.

The same pattern of CS indexes may be associated with different CS groups 362. Alternatively, different patterns of CS indexes may be associated with different CS groups 362. For example, different offset values ($\Delta_{group}$) may be used for different CS groups 362.

According to the CS index calculation method 4, different CS indexes are associated with the RUs within a CS group formed at an interval of $N_{comb}$ RUs. When SRSs are allocated to RUs formed at an interval of $N_{comb}$ RUs, the probability that the same CS index will be used within the band of the allocated SRSs is reduced. That is, the probability that case A, case C, and case D will occur is reduced. It is thus possible to decrease the probability that CM will become high. Additionally, as in the CS index calculation method 1, signaling overhead can also be reduced.

In the CS calculation methods according to the second embodiment, a combination of CS indexes that increases CM of SRS may be used depending on the allocation pattern of SRSs to RUs. When conducting scheduling, the base station 10 may allocate transmit bands to RUs so that the use of combinations of CS indexes (the above-described case A through case D) that increase CM can be avoided.

In the second embodiment, the base station 10 may dynamically inform the terminal 12 of the CS offset value by using DCI or semi-statically inform the terminal 12.

Instead of the base station 10 informing the terminal 12 of the CS offset value, the CS offset value may be calculated from the ID (RNTI) of the terminal 12.

The above-described embodiments may be configured in the following manner.

In the multiple short sequence based SRS, when the transmission power of the terminal 12 has reached the maximum power, some partial bands may be dropped (not transmitted). In the multiple short sequence based SRS, decreasing the number of partial bands can reduce required transmission power and also decrease CM. This enables the terminal 12 to transmit SRS with the demanded uplink transmission power.

By using the multiple short sequence based SRS, although it is not possible to estimate the uplink channel quality in dropped partial bands, the orthogonality using CS in transmitted partial bands can be maintained, thereby making it possible to estimate the uplink channel quality.

If SRS is generated as a result of dividing a sequence having a length corresponding to the entire transmit band into partial bands, dropping of some partial bands disturb the orthogonality using CS in all the partial bands. This makes it difficult to estimate the uplink channel quality.

In the above-described embodiments, as information to be transmitted, SRS has been discussed by way of example. However, instead of SRS, reference signals using orthogonal sequences, such as DM-RS (demodulation reference signal) and CSI-RS (Channelstate information reference signal), may be used.

As SRS sequence data, instead of ZC sequence, GCL (Generalized Chirp Like) sequence, M sequence, Computer generated CAZAC sequence used when signal bandwidth is 1 RB or 2 RBs in LTE/LTE-Advanced system may be used.

The embodiments of the present disclosure have been discussed above. The modes of the above-described embodiments may be combined in any manner.

The present disclosure may be implemented by software, hardware, or software operating together with hardware. The functional blocks utilized for describing the above-described embodiments may entirely or partially be implemented by an LSI, which is one example of integrated circuits. The processes discussed in the above-described embodiments may entirely or partially be controlled by one LSI or a combination of LSIs. An LSI may be constituted by individual chips or by one chip implementing all or some of the functional blocks. An LSI may include data input and output. An LSI may be called an IC, a system LSI, a super LSI, or an ultra LSI, depending on the integration degree. The integration of the functional blocks and processes is not necessarily implemented by using an LSI. Instead, a dedicated circuit, a general-purpose processor, or a dedicated processor may be used. A FPGA (Field Programmable Gate Array) that is programmable after an LSI is manufactured, or a reconfigurable processor that may reconfigure connections or settings of circuit cells within an LSI may be used. The present disclosure may be implemented as digital processing or analog processing. Due to the progress of semiconductor technologies or the appearance of a derivative technology, if a circuit integration technology which replaces an LSI technology is developed, the functional blocks may be integrated by utilizing such a technology. The application of a biotechnology, for example, may be one of such cases.

A terminal of the present disclosure includes a circuit and a transmitter. The circuit specifies a frequency domain to be used for transmitting a reference signal using predetermined sequence data and applies a phase shift index associated with the specified frequency domain to the reference signal. The transmitter transmits the reference signal to which the phase shift index is applied by using the specified frequency domain.

In the terminal of the present disclosure, a random phase shift index is associated with each of a plurality of frequency domains.

In the terminal of the present disclosure, the random phase shift index is an index calculated based on a predetermined pseudorandom number.

In the terminal of the present disclosure, a phase shift index is associated with each of a plurality of continuous frequency domains. The phase shift indexes associated with the plurality of continuous frequency domains are different from each other.

In the terminal of the present disclosure, the phase shift index is an index calculated based on an ID which varies among terminals.

In the terminal of the present disclosure, the phase shift index is an index calculated based on an offset value supplied from a base station. The offset value varies among terminals.

A base station of the present disclosure includes a receiver and a circuit. The receiver receives a reference signal using predetermined sequence data in a specific frequency domain. The circuit compares a base signal and the reference signal with each other. The base signal is a signal to which a phase shift index associated with the specific frequency domain is applied.

A communication method of the present disclosure includes: specifying a frequency domain to be used for transmitting a reference signal using predetermined sequence data and applying a phase shift index associated with the specified frequency domain to the reference signal; and transmitting the reference signal to which the phase shift index is applied by using the specified frequency domain.

A communication method of the present disclosure includes: receiving a reference signal using predetermined sequence data in a specific frequency domain; and comparing a base signal and the reference signal with each other. The base signal is a signal to which a phase shift index associated with the specific frequency domain is applied.

The above-described embodiments have been provided for the purposes of illustration and description of the present invention. It is not intended to be exhaustive or to limit the scope of the invention to the embodiments. Those skilled in the art may carry out the invention in various other modes without departing from the spirit and scope of the invention.

An embodiment of the present disclosure is suitably used in a mobile communication system.

REFERENCE SIGNS LIST 10 base station
11 circuit
12 terminal
13 circuit
20 receiver
21 antenna
22 demodulator-decoder
24 SRS extractor
26 quality estimator
28 scheduler
30 replica generator
32 CS index calculator
34 SRS resource storage
36 SRS control signal generator
38 modulator-coder
40 transmitter
60 receiver
61 antenna
62 demodulator-decoder
64 CS index calculator
66 SRS generator
68 SRS band setter
70 modulator-coder
72 transmitter

The invention claimed is:

1. A terminal comprising:
circuitry, which, in operation, generates a signal based on both a plurality of cyclic shift indexes that are associated with a plurality of frequency resources, respectively, and another cyclic shift index that is configured per terminal; and
a transmitter, which, in operation, transmits the generated signal in the plurality of frequency resources.

2. The terminal according to claim 1, wherein the signal is comprised of a plurality of sequences that are mapped to the plurality of frequency resources, respectively, and the circuitry, in operation, generates the signal using the plurality of cyclic shift indexes for the plurality of sequences, respectively.

3. The terminal according to claim 2, wherein each of the plurality of sequences has a sequence length corresponding to one of the plurality of frequency resources.

4. The terminal according to claim 1, wherein the plurality of cyclic shift indexes associated with the plurality of frequency resources are different from each other.

5. The terminal according to claim 1, wherein the circuitry, in operation, generates the signal based on a cyclic shift index obtained by adding the another cyclic shift index to the plurality of cyclic shift indexes that are associated with the plurality of frequency resources, respectively.

6. The terminal according to claim 1, wherein the another cyclic shift index is provided from a base station.

7. The terminal according to claim 1, wherein the plurality of frequency resources are inconsecutive in a frequency domain.

8. The terminal according to claim 1, wherein the plurality of frequency resources are apart from each other with an interval.

9. The terminal according to claim 1, wherein the plurality of cyclic shift indexes are uniquely associated with the plurality of frequency resources, respectively.

10. A communication method comprising:
generating a signal based on both a plurality of cyclic shift indexes that are associated with a plurality of frequency resources, respectively, and another cyclic shift index that is configured per terminal; and
transmitting the generated signal in the plurality of frequency resources.

11. The communication method according to claim 10, wherein the signal is comprised of a plurality of sequences that are mapped to the plurality of frequency resources, respectively, and the generating includes generating the signal using the plurality of cyclic shift indexes for the plurality of sequences, respectively.

12. The communication method according to claim 11, wherein each of the plurality of sequences has a sequence length corresponding to one of the plurality of frequency resources.

13. The communication method according to claim 10, wherein the plurality of cyclic shift indexes associated with the plurality of frequency resources are different from each other.

14. The communication method according to claim 10, wherein the generating includes generating the signal based on a cyclic shift index obtained by adding the another cyclic shift index to the plurality of cyclic shift indexes that are associated with the plurality of frequency resources, respectively.

15. The communication method according to claim 10, wherein the another cyclic shift index is provided from a base station.

16. The communication method according to claim 10, wherein the plurality of frequency resources are inconsecutive in a frequency domain.

17. The communication method according to claim 10, wherein the plurality of frequency resources are apart from each other with an interval.

18. The communication method according to claim 10, wherein the plurality of cyclic shift indexes are uniquely associated with the plurality of frequency resources, respectively.

* * * * *